(12) United States Patent
Li

(10) Patent No.: US 12,471,195 B1
(45) Date of Patent: Nov. 11, 2025

(54) LED LIGHTING CIRCUIT WITHOUT DRIVING POWER SUPPLY AND LED LIGHT STRING

(71) Applicant: iLamp Technology Co., Ltd, Shenzhen (CN)

(72) Inventor: Yuanlong Li, Shenzhen (CN)

(73) Assignee: iLamp Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/183,965

(22) Filed: Apr. 21, 2025

(51) Int. Cl.
*H05B 45/37* (2020.01)
*F21S 4/10* (2016.01)
*F21V 23/06* (2006.01)
*F21V 25/10* (2006.01)
*H05B 45/50* (2022.01)
*F21Y 115/10* (2016.01)

(52) U.S. Cl.
CPC ............... *H05B 45/37* (2020.01); *F21S 4/10* (2016.01); *F21V 23/06* (2013.01); *F21V 25/10* (2013.01); *H05B 45/50* (2020.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 7,377,802 B2* | 5/2008 | Allen | ..................... | H01R 29/00 439/490 |
| 7,609,006 B2* | 10/2009 | Gibboney | .............. | H05B 45/00 315/185 S |
| 7,705,706 B2* | 4/2010 | Ding | ..................... | H01R 13/68 337/198 |
| 2006/0007679 A1* | 1/2006 | Allen | ........................ | F21S 4/10 257/E33.073 |
| 2007/0063657 A1* | 3/2007 | Wu | ........................ | H05B 45/30 315/205 |
| 2017/0202061 A1* | 7/2017 | Allen | .................... | F21V 23/001 |
| 2019/0341718 A1* | 11/2019 | Yu | ......................... | F21V 21/096 |

* cited by examiner

*Primary Examiner* — Anh Q Tran
(74) *Attorney, Agent, or Firm* — Jose Cherson Weissbrot

(57) ABSTRACT

The present invention relates to a LED lighting circuit without a driving power supply, including a rectification module, a current-limiting and voltage-reducing module, and an LED illumination module. The AC power supply is connected to the rectification module; the current-limiting and voltage-reducing module is connected to the rectification module; and the LED illumination module includes multiple LED beads. The invention aims to reduce operational energy consumption of LED light strings.

11 Claims, 10 Drawing Sheets

LED LIGHTING CIRCUIT WITHOUT DRIVING POWER SUPPLY AND LED LIGHT STRING

TECHNICAL FIELD

The present invention relates to the technical field of LED luminaires, and particularly relates to an LED lighting circuit without a driving power supply and an LED light string.

BACKGROUND ART

LED luminaires offer advantages such as energy efficiency, durability, and environmental friendliness, making them widely recognized across various fields and promoting their adoption as a new generation of light sources. Most existing LED illumination devices are DC-powered, requiring an independent driving power supply for operation and preventing direct connection to mains electricity. This configuration complicates a use of LED luminaires. Moreover, an additional driving power supply increases manufacturing costs for DC LED devices, introduces redundant energy consumption, and negatively impacts an overall lifespan of the luminaire due to added structural components.

SUMMARY OF THE INVENTION

An objective of the present invention is to provide an LED lighting circuit without a driving power supply, aiming to reduce a cost of LED light strings and lower an operating energy consumption of LED light strings.

To achieve the above objective, the present invention provides an LED lighting circuit without a driving power supply, including: an AC power supply; a rectification module; a current-limiting and voltage-reducing module; and an LED illumination module; wherein an input terminal of the AC power supply is connected to the rectification module for converting an AC power into a pulsating DC voltage;

the current-limiting and voltage-reducing module includes at least one limiting unit, with one end connected to an output terminal of the rectification module and the other end connected to the LED illumination module;

the LED illumination module includes multiple LED beads connected in series and/or parallel, wherein a total forward voltage drop of the LED beads matches an output voltage of the current-limiting and voltage-reducing module, enabling a stable operation of the LED illumination module without an independent driving power supply.

In one embodiment of the present application, the LED illumination module includes multiple LED sub-modules connected in parallel;

each LED sub-module includes multiple LED beads connected in series and/or parallel.

In one embodiment of the present application, the rectification module is a full-bridge rectifier circuit including an even number of rectifier diodes connected in a bridge configuration;

the rectification module is provided with connection terminals, with both ends of each connection terminal connected to rectifier diodes oriented oppositely relative to the connection terminal, and the input terminal of the AC power supply is connected to the connection terminals.

In one embodiment of the present application, at least two rectification modules are provided, arranged symmetrically, with the AC power supply corresponding to one rectification module;

a conduction circuit is provided between the two rectification modules, with rectifier diodes connected at both ends of the conduction circuit oriented oppositely;

at least two conduction circuits are provided, with the LED illumination module located between the two conduction circuits, and an input terminal of the LED illumination module arranged opposite to the AC power supply.

In one embodiment of the present application, a protection unit is provided between the AC power supply and the rectification module;

the protection unit includes a transient voltage suppressor and/or a varistor for an overvoltage protection of the AC power supply.

To achieve the above objective, the present invention provides an LED light string including the above LED lighting circuit without a driving power supply, wherein: the LED light string includes a light string circuit with multiple mounting portions spaced apart, each mounting portion provided with an LED lamp assembly;

a first connection terminal and a second connection terminal are provided at two ends of the light string circuit, with a male power connection terminal provided on one end face of the first connection terminal away from the light string circuit, and a female connection terminal provided at the second connection terminal corresponding to the male power connection terminal.

In another embodiment of the present application, the LED lamp assembly includes a connection lamp housing and an LED lamp structure; a connection cavity is provided at one end of the connection lamp housing relative to the LED lamp structure and a connection groove is provided at the other end of the connection lamp housing relative to the light string circuit, with the connection groove surrounding the light string circuit;

the connection cavity is provided with a first electrode plate relative to the LED lamp structure, with the first electrode plate connected to the connection groove and abutting against the light string circuit.

In another embodiment of the present application, the connection lamp housing is provided with a connection portion in a protruding manner along a direction from the female connection terminal to the male power connection terminal; the connection portion has one end connected to an outer wall of the connection cavity and the other end connected to the connection groove, with the connection portion surrounding the light string circuit.

In another embodiment of the present application, the connection portion is provided with a second electrode plate facing the connection cavity; the second electrode plate is electrically connected to the light string circuit and connected to the outer wall of the connection cavity; a side wall of the LED lamp structure is connected to the connection cavity and electrically connected to the second electrode plate.

In another embodiment of the present application, the connection cavity is provided with an open end facing the LED lamp structure; a diameter of the open end gradually increases along a direction from the connection groove to the open end; the open end surrounds a power connection terminal of the LED lamp structure.

In another embodiment of the present application, the first connection terminal is provided with an installation cavity installed with a fuse mechanism connected to the male power connection terminal;

the first connection terminal is provided with a detachably connected cover plate relative to the installation cavity.

In another embodiment of the present application, the installation cavity is provided with a limiting sliding groove relative to the cover plate; the cover plate is slidably connected to the limiting sliding groove; an end of the limiting sliding groove facing the male power connection terminal is provided with a limiting portion relative to the cover plate.

In another embodiment of the present application, a side wall of the connection lamp housing is provided with auxiliary fixing members; the auxiliary fixing members provided on multiple LED lamp assemblies are located on the same side of the light string circuit.

By adopting the above technical solutions, the present invention has the following advantages.

1. To enable a direct connection to AC power without installing a driving power supply and supporting components of the driving power supply, the LED lighting circuit itself includes a rectification module, a current-limiting and voltage-reducing module, and a LED illumination module. The rectification module is a rectifier circuit with diodes arranged on the circuit. The LED lighting circuit is connected to the AC power supply through the rectification module. The circuit includes multiple interconnected diodes, forming a more stable diode structure. When passing through the rectification module, an AC power is converted into a pulsating DC voltage. Since the LED illumination module also has a diode structure, an DC power enables a more stable operation of the LED illumination module after the AC power is converted into the DC power. The LED lamp composed of LED lighting circuits are widely used in various aspects of daily life, where the most commonly available stable high-voltage power supply is the AC power. By incorporating the rectification module, the LED lighting circuit can operate stably in different working environments according to user needs, significantly improving user experience.

2. To ensure a stable operation of the LED illumination module without a driving power supply, a current-limiting and voltage-reducing module is provided between the LED illumination module and the rectification module. The limiting unit of the current-limiting and voltage-reducing module is typically a resistor structure connected in series between the LED illumination module and the rectification module. The resistor structure can include resistors with different values and quantities, reducing an input voltage of the LED lighting circuit to a safer and more stable level, thereby improving an operational stability of the LED illumination module. Additionally, the limiting unit of the current-limiting and voltage-reducing module can be a passive capacitive element in the structure, such as a film capacitor or a safety capacitor, with a withstand voltage rating 1 to 3 times higher than the peak input voltage of the AC power supply. By connecting the passive capacitive element in parallel with the LED illumination module, a stability of the entire LED lighting circuit can also be ensured. Through the above current-limiting and voltage-reducing module, the entire LED lighting circuit is simplified, ensuring a stable circuit operation while reducing the use of complex components, thereby lowering a cost of LED light strings and reducing an operating energy consumption of LED light strings.

3. Since this LED lighting circuit is used in LED light strings, the LED illumination module itself structurally includes multiple LED beads. The LED beads can be connected in series/parallel to form a light string. Meanwhile, the current-limiting and voltage-reducing module can reduce the voltage of the AC power supply. The LED illumination module is connected to the output terminal of the current-limiting and voltage-reducing module. Depending on using different current-limiting and voltage-reducing modules connected with the AC power supply, the output voltage of the output terminal of the current-limiting and voltage-reducing module varies. The LED illumination module can adjust the number of LED beads and LED beads in varying quantities can be interconnected through different connection structures to form light strings. The total forward voltage drop of the LED beads in the light string configuration matches the output voltage, effectively eliminating the need for external constant current sources, switching power supply chips, or transformers. Instead, the LED lighting circuit achieves self-stabilizing operation through the impedance matching between the limiting unit in the current-limiting and voltage-reducing module and the LED illumination module.

BRIEF DESCRIPTION OF THE DRAWINGS

To more clearly illustrate the technical solutions in the embodiments of the present invention or the prior art, the following briefly introduces the accompanying drawings required for describing the embodiments or prior art. Obviously, the drawings in the following description show only some embodiments of the present invention. For those of ordinary skill in the art, other drawings may be derived from these illustrated structures without creative effort.

Figure 1:
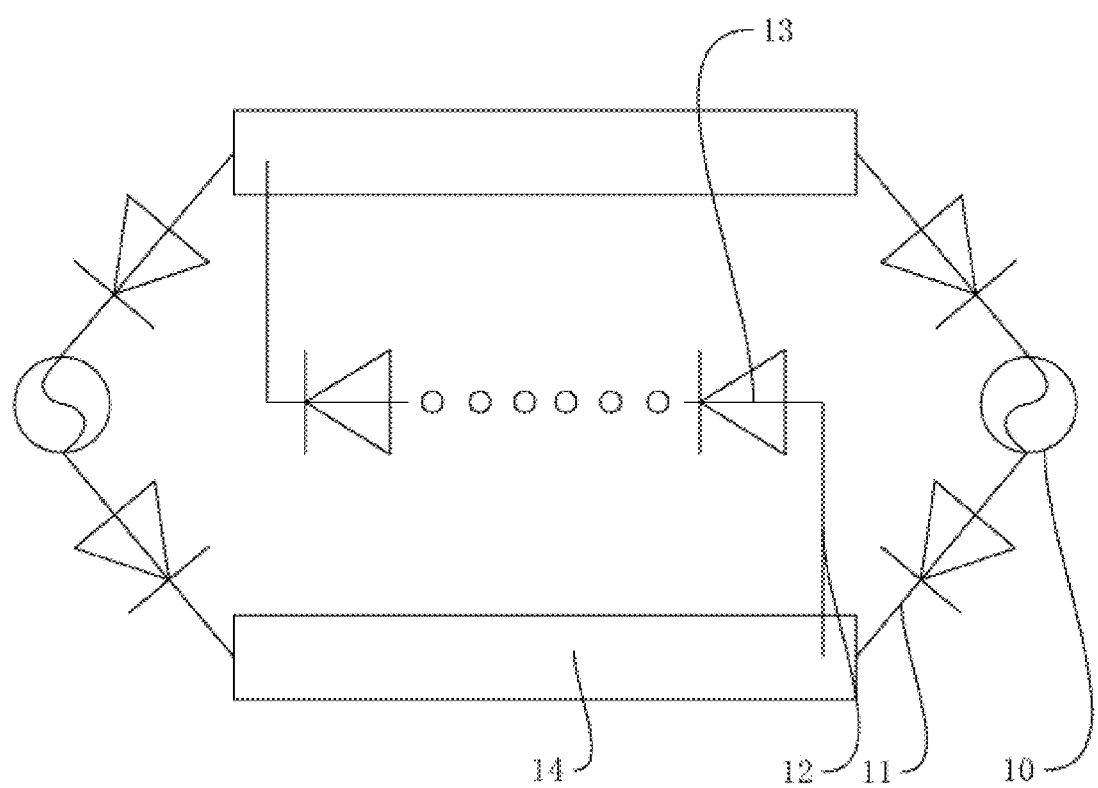
FIG. 1 is a schematic structural diagram of an LED lighting circuit without a driving power supply according to the present invention.

The followings are description of reference numerals.

10. AC power supply; 11. Rectification module; 12. Current-limiting and voltage-reducing module; 13. LED illumination module; 14. Conduction circuit; 1. Light string circuit; 2. First connection terminal; 21. Male power connection terminal; 3. Second connection terminal; 31. Female connection terminal; 4. LED lamp assembly; 5. Connection lamp housing; 51. Connection cavity; 52. Open end; 53. Connection groove; 6. Connection portion; 7. LED lamp structure.

The implementation of the objectives, functional features, and advantages of the present invention will be further explained in conjunction with the embodiments and with reference to the accompanying drawings.

DETAILED DESCRIPTION OF THE INVENTION

To make objectives, technical solutions and advantages of the present application clearer, the following describes the present application in further detail with reference to the accompanying drawings and embodiments. It should be understood that the specific embodiments described herein are merely illustrative of the application and are not intended to limit it.

Referring to FIG. 1, the LED lighting circuit without a driving power supply provided in the present invention includes an AC power supply 10, a rectification module 11, a current-limiting and voltage-reducing module 12, and an LED illumination module 13. An input terminal of the AC power supply 10 is connected to the rectification module 11 for converting an AC power into a pulsating DC voltage.

The current-limiting and voltage-reducing module 12 includes at least one limiting unit, with one end connected to an output terminal of the rectification module 11 and the other end connected to the LED illumination module 13.

The LED illumination module 13 includes multiple LED beads connected in series and/or parallel. A total forward voltage drop of the multiple LED beads matches an output voltage of the current-limiting and voltage-reducing module 12, enabling a stable operation of the LED illumination module 13 without an independent driving power supply.

To enable a direct connection to the AC power supply 10 without installing a driving power supply and supporting components of the AC power supply 10, the LED lighting circuit itself includes the rectification module 11, the current-limiting and voltage-reducing module 12, and the LED illumination module 13. The rectification module 11 is a rectifier circuit with diodes arranged on the circuit. The LED lighting circuit is connected to the AC power supply 10 through the rectification module 11. The circuit has multiple interconnected diodes, forming a more stable diode structure. When passing through the rectification module 11, the AC power is converted into the pulsating DC voltage. Since the LED illumination module 13 also has a diode structure, the DC power enables a more stable operation of the LED illumination module 13 after the AC power is converted into the DC power. LED lamps composed of LED lighting circuits are widely used in various aspects of daily life, where the most commonly available stable high-voltage power supply is the AC power 10. By incorporating the rectification module 11, the LED lighting circuit can operate stably in different working environments according to user needs, significantly improving user experience.

To ensure a stable operation of the LED illumination module 13 without a driving power supply, the current-limiting and voltage-reducing module 12 is provided between the LED illumination module 13 and the rectification module 11. The limiting unit of the current-limiting and voltage-reducing module 12 is typically a resistor structure connected in series between the LED illumination module 13 and the rectification module 11. The resistor structure can include resistors with different values and quantities, reducing the input voltage of the LED lighting circuit to a safer and more stable level, thereby improving an operational stability of the LED illumination module 13. Additionally, the limiting unit of the current-limiting and voltage-reducing module 12 can be a passive capacitive element, such as a film capacitor or a safety capacitor, with a withstand voltage rating 1 to 3 times higher than the peak input voltage of the AC power supply 10. By connecting the passive capacitive element in parallel with the LED illumination module 13, the stability of the entire LED lighting circuit can also be ensured. Through the above current-limiting and voltage-reducing module 12, the entire LED lighting circuit is simplified, ensuring a stable circuit operation while reducing the use of complex components, thereby lowering a cost of LED light strings and reducing an operating energy consumption of of LED light strings.

Since this LED lighting circuit is used in LED light strings, the LED illumination module 13 itself structurally includes multiple LED beads. The LED beads can be connected in series/parallel to form a light string. Meanwhile, the current-limiting and voltage-reducing module 12 can reduce a voltage of the AC power supply 10. The LED illumination module 13 is connected to the output terminal of the current-limiting and voltage-reducing module 12. Depending on using different current-limiting and voltage-reducing modules 12 connected with the AC power supply 10, the output voltage of the output terminal of the current-limiting and voltage-reducing module the module varies. The LED illumination module 13 can adjust the number of LED beads and LED beads in varying quantities can be interconnected through different connection structures to form light strings. The total forward voltage drop of the LED beads in the light string configuration matches the output voltage, effectively eliminating the need for external constant current sources, switching power supply chips, or transformers. Instead, the circuit achieves a self-stabilizing operation through the impedance matching between the limiting unit in the current-limiting and voltage-reducing module 12 and the LED illumination module 13.

Referring to FIG. 1, the LED illumination module 13 includes multiple LED sub-modules connected in parallel. Each LED sub-module includes multiple LED beads connected in series and/or parallel.

This LED lighting circuit is generally used in LED light strings. Each LED sub-module may correspond to a lamp structure in an LED light string. The LED lamp may include multiple LED beads, which can be connected in series or parallel. The only requirement for the multiple beads is that the diodes inside the beads must face the same direction, and the total forward voltage drop of the multiple LED sub-modules must match the output voltage of the current-limiting and voltage-reducing module 12, enabling a stable operation of the LED lighting circuit without an independent driving power supply.

Referring to FIG. 1, the rectification module 11 is a full-bridge rectifier circuit composed of an even number of rectifier diodes connected in a bridge configuration.

The rectification module 11 is provided with connection terminals, with both ends of each connection terminal connected to rectifier diodes oriented oppositely relative to the connection terminal. The input terminal of the AC power supply 10 is connected to the connection terminals.

To ensure better rectification, the rectification module 11 is a full-bridge rectifier circuit composed of an even number of rectifier diodes connected in a bridge configuration. The rectification module 11 is provided with connection terminals. The rectifier diodes connected at both ends of each connection terminal are oriented toward and away from the connection terminal respectively. The input terminal of the AC power supply 10 is connected to the connection terminals. The rectifier diode oriented away from the connection terminal can filter the AC power, converting the power entering the LED illumination module 13 into the DC power. This structure ensures a stable operation of the LED illumination module 13.

Figure 2:
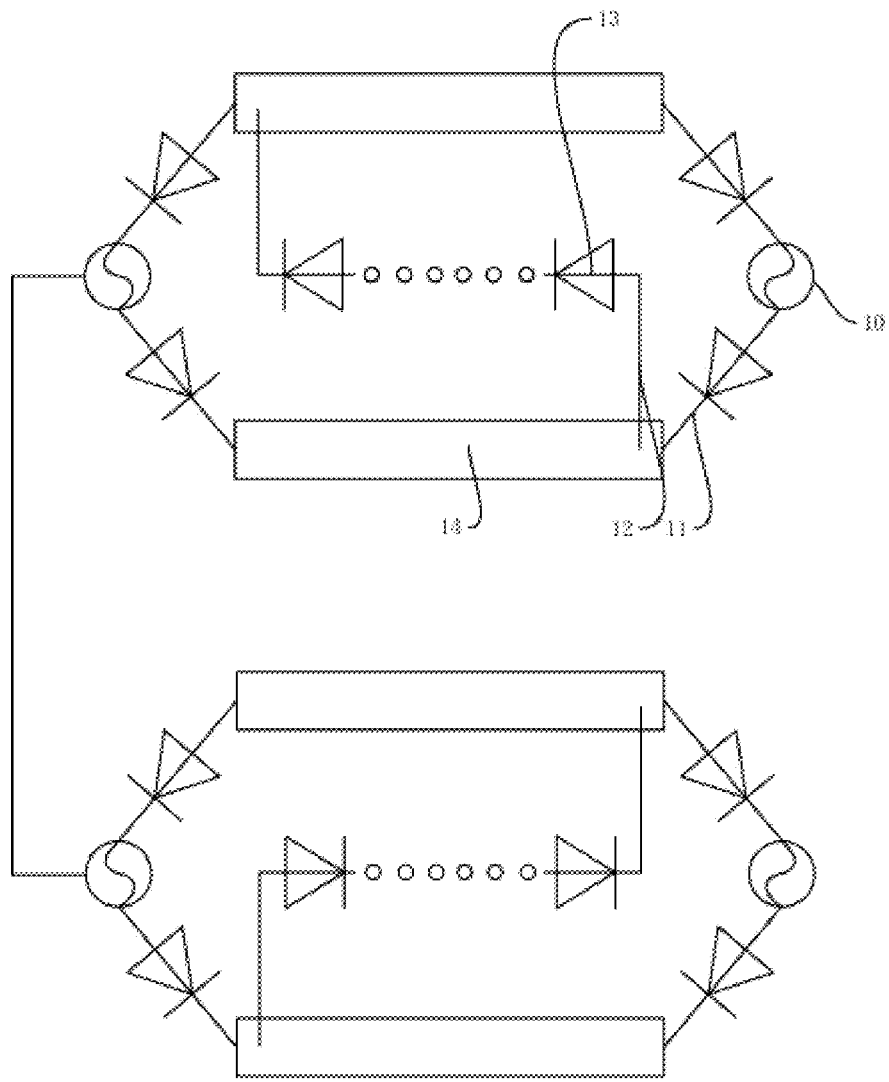
FIG. 2 is a schematic connection structure diagram of the LED lighting circuit without a driving power supply according to the present invention.

Referring to FIGS. 1-2, at least two rectification modules 11 are provided, arranged symmetrically, with the AC power supply 10 corresponding to one rectification module 11.

A conduction circuit 14 is provided between the two rectification modules 11, with rectifier diodes connected at both ends of the conduction circuit 14 oriented oppositely.

At least two conduction circuits 14 are provided, with the LED illumination module 13 located between the two conduction circuits, and the input terminal of the LED illumination module 13 arranged opposite to the AC power supply 10.

There are two rectification modules 11. The two rectification modules 11 form a rectifier bridge structure, which can make the rectified voltage smoother and more stable. The conduction circuit 14 is provided between endpoints of the rectifier diodes on the rectifier bridge where the endpoints are oppositely oriented. The conduction circuit 14 can connect the LED illumination module 13. Only one connection terminal of the LED illumination module 13 is connected to the AC power supply 10, and a corresponding input terminal of the LED illumination module 13 is arranged facing the AC power supply 10 to ensure power supply stability.

In this application, one end of the LED light string is provided with a male power connection terminal 21 for connecting to the power supply and the other end of the LED light string is provided with a female connection terminal 31. If there are multiple LED light strings, when one light string is connected to the power supply, another light string can be connected to the female connection terminal 31 of the light string connected to the power supply through the male power connection terminal of the light string. This facilitates an arrangement of multiple light strings. This structure is reflected in the LED lighting circuit as follows: one connection terminal of the preceding lighting circuit is connected to the AC power supply 10, and one connection terminal of the following lighting circuit is connected to the other connection terminal of the preceding lighting circuit away from the AC power supply 10. This structure allows users to arrange multiple LED light strings more conveniently and makes an entire structure more stable, ensuring that all light strings can operate stably.

Referring to FIG. 1, a protection unit is provided between the AC power supply 10 and the rectification module 11.

The protection unit includes a transient voltage suppressor and/or a varistor for overvoltage protection of the AC power supply 10.

To prevent an excessive voltage of the AC power supply 10 from burning out the rectification module 11, the protection unit is provided between the AC power supply 10 and the rectification module 11. The protection unit is a transient voltage suppressor and/or varistor structure, which can protect the entire circuit from damage due to a high voltage.

The present invention also provides an LED light string. A specific structure of the LED lighting circuit without a driving power supply refers to the above embodiments. Since this LED light string adopts all the technical solutions of the above embodiments, this LED light string at least has all the beneficial effects brought by the technical solutions of the above embodiments, which will not be repeated here.

Referring to FIGS. 3-10, the LED light string includes a light string circuit 1 with multiple mounting portions spaced apart. Each mounting portion is provided with an LED lamp assembly 4. Two ends of the light string circuit 1 are respectively provided with a first connection terminal 2 and a second connection terminal 3. The end face of the first connection terminal 2 away from the light string circuit 1 is provided with a male power connection terminal 21. The second connection terminal 3 is provided with a female connection terminal 31 corresponding to the male power connector 21.

The LED light string includes the light string circuit 1. Multiple LED lamp assemblies 4 can be connected to the light string circuit 1 by providing mounting portions. The two ends of the light string circuit 1 are respectively provided with the first connection terminal 2 with the male power connection terminal and the second connection terminal 3 with the female connection terminal 31. An LED light string can be connected to the power supply through the first connection terminal 2 to make the LED light string operate stably.

If the user has at least two LED light strings, another LED light string does not need to be directly connected to the power supply. The first connection terminal 2 of another LED light string can be directly connected to the second connection terminal 3 of the preceding LED light string. With this structure, the LED light strings can be arranged conveniently. The second connection terminal 3 of an LED light string can be connected to another LED light string or not, which does not affect an normal operation of the LED lamp assemblies 4 on the LED light string.

Referring to FIGS. 6-10, the LED lamp assembly 4 includes a connection lamp housing 5 and an LED lamp structure 7. One end of the connection lamp housing 5 is provided with a connection cavity 51 relative to the LED lamp structure 7, and the other end is provided with a connection groove 53 relative to the light string circuit 1. The connection groove 53 surrounds the light string circuit 1.

The connection cavity 51 is provided with a first electrode plate relative to the LED lamp structure 7. The first electrode plate is connected to the connection groove 53 and abuts against the light string circuit 1.

The LED lamp assembly 4 includes the LED lamp structure 7 and the connection lamp housing 5. In this application, the LED lamp structure 7 can have different shapes, which do not affect an normal operation of the LED lamp structure 7.

One end of the connection lamp housing 5 is provided with the connection cavity 51 for connecting the LED lamp structure 7. The connection cavity 51 is generally provided with threads for quick connection of the LED lamp. The other end of the connection lamp housing 5 is provided with the connection groove 53, which is a longer inner groove. The light string circuit 1 passes through the connection groove 53. Through the connection groove 53, an LED lamp assembly 4 can clamp a section of the light string circuit 1. The first electrode plate is provided inside the connection lamp housing. The light string circuit 1 connected to the first electrode plate is always in a stable state under an action of the connection groove 53, making the connection of the first electrode plate itself more stable and ensuring a more stable working environment for the LED lamp structure 7.

Referring to FIGS. 3-7, the connection lamp housing 5 is provided with a connection portion 6 in a protruding manner along a direction from the female connection terminal 31 to the male power connection terminal 21. One end of the connection portion 6 is connected to an outer wall of the connection cavity 51, and the other end connection portion is connected to the connection groove 53. The connection portion 6 surrounds the light string circuit 1.

The connection lamp housing 5 is provided with the connection portion 6. Since electricity enters the LED light string along a direction from the first connection terminal 2 to the second connection terminal 3, the connection portion 6 is arranged facing the male power connection terminal 21, allowing the connection portion 6 to further clamp the light string circuit 1 and ensure the operational stability of the LED lamp structure 7.

Referring to FIGS. 3-7, the connection portion 6 is provided with a second electrode plate facing the connection cavity 51. The second electrode plate is electrically connected to the light string circuit 1 and connected to the outer wall of the connection cavity 51. A side wall of the LED lamp structure 7 is connected to the connection cavity 51 and electrically connected to the second electrode plate.

The connection portion 6 is provided with the second electrode plate inside. The second electrode plate is connected to the light string circuit 1 and the outer wall of the connection cavity 51. When the LED lamp structure 7 is screwed into the housing, the side wall of the LED lamp structure 7 will connect to the connection cavity 51 and electrically connect to the second electrode plate, making the entire LED light string operate more stably. A separation of the second electrode plate and the first electrode plate can effectively prevent short circuits in the light string circuit 1 and avoid potential safety hazards.

Figure 7:
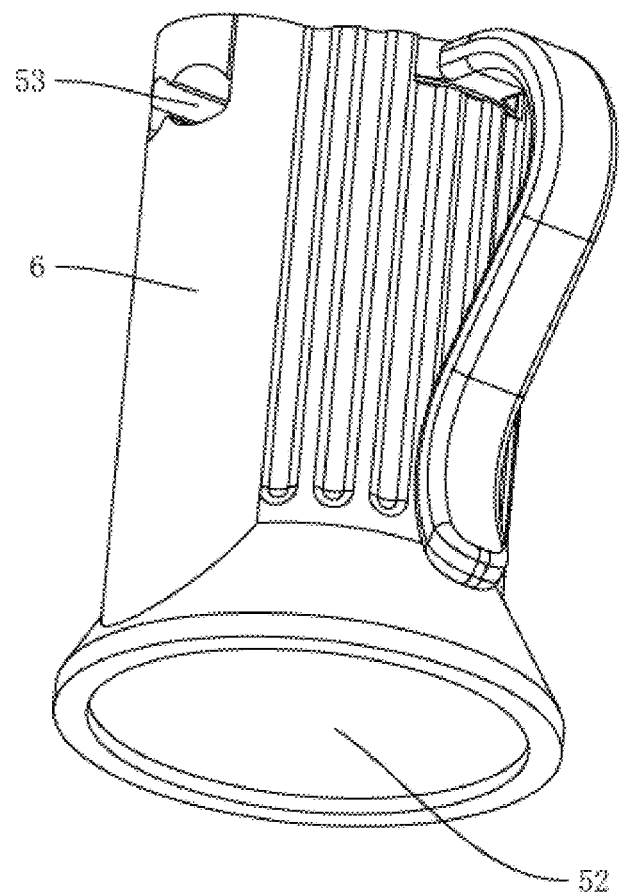
FIG. 7 is a structural schematic of the connection lamp housing in the LED light string according to the present invention.
Figure 8:
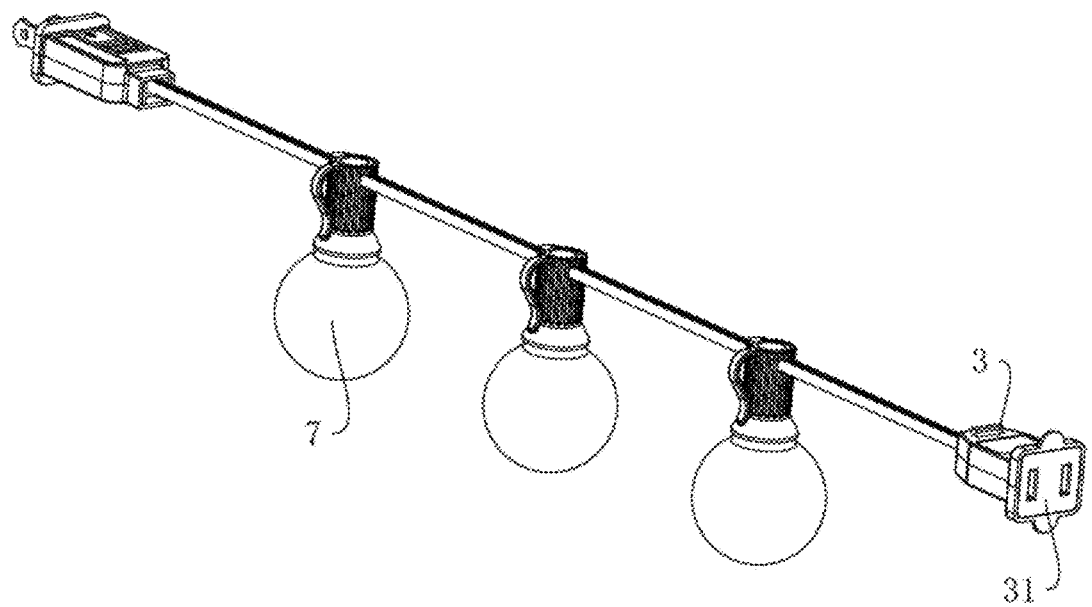
FIG. 8 is a structural schematic of another embodiment of the LED light string according to the present invention.
Figure 9:
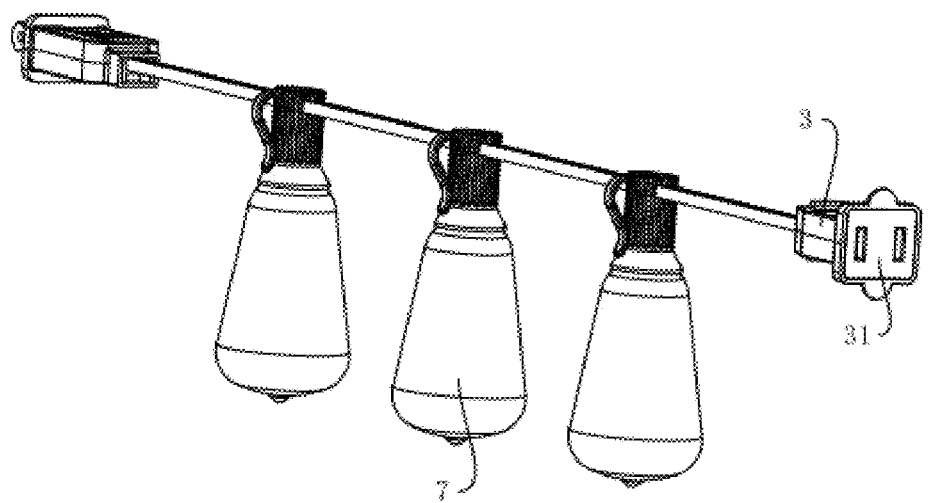
FIG. 9 is a structural schematic of yet another embodiment of the LED light string according to the present invention.
Figure 10:
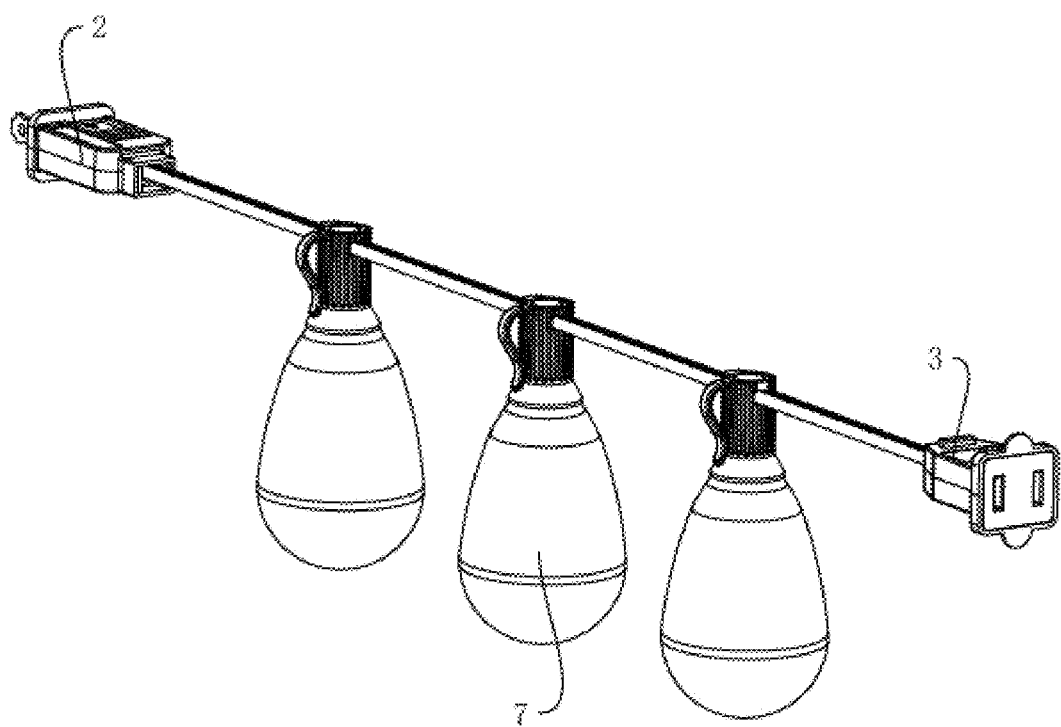
FIG. 10 is a structural schematic of a further embodiment of the LED light string according to the present invention.

Referring to FIG. 7, the connection cavity 51 is provided with an open end 52 facing the LED lamp structure 7. A diameter of the open end 52 gradually increases along the direction from the connection groove 53 to the open end 52. The open end 52 surrounds a power connection terminal of the LED lamp structure 7.

The open end 52 is flared. The open end 52 can hide the power connection terminal of the LED lamp structure 7, making the entire LED light string more aesthetically pleasing while completely concealing an electrified part of the LED lamp structure 7 to avoid accidents.

Figure 3:
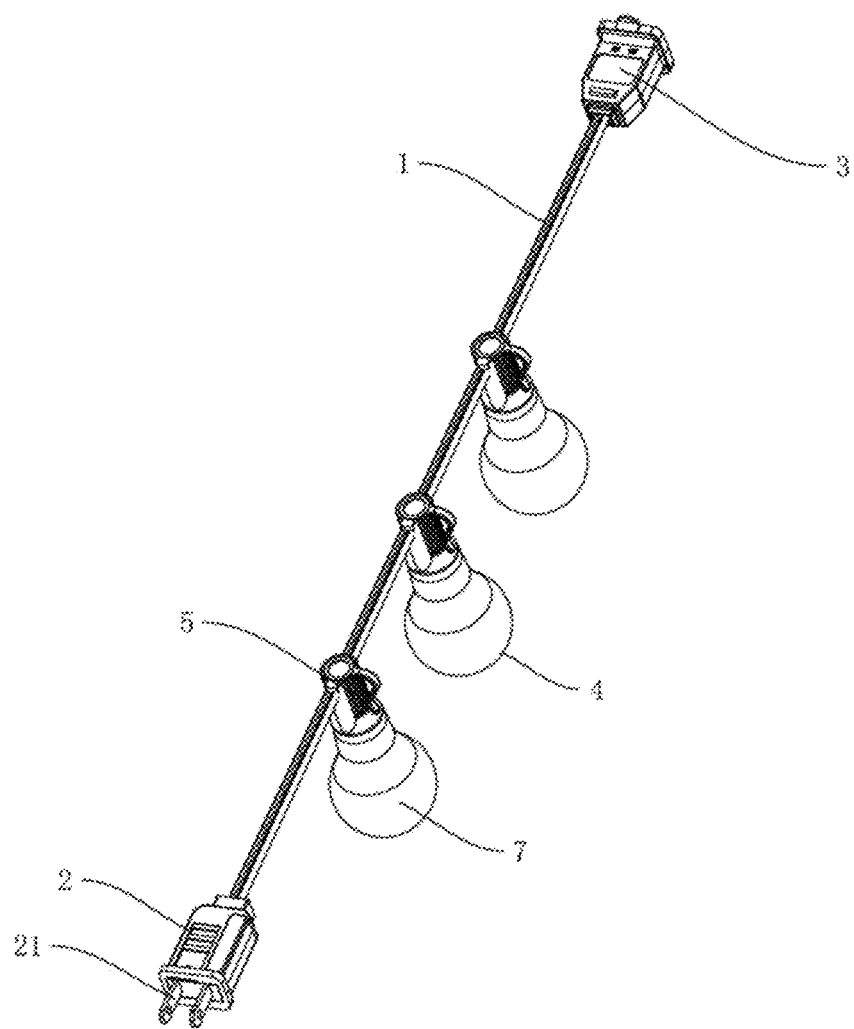
FIG. 3 is a structural schematic of one embodiment of the LED light string according to the present invention.
Figure 4:
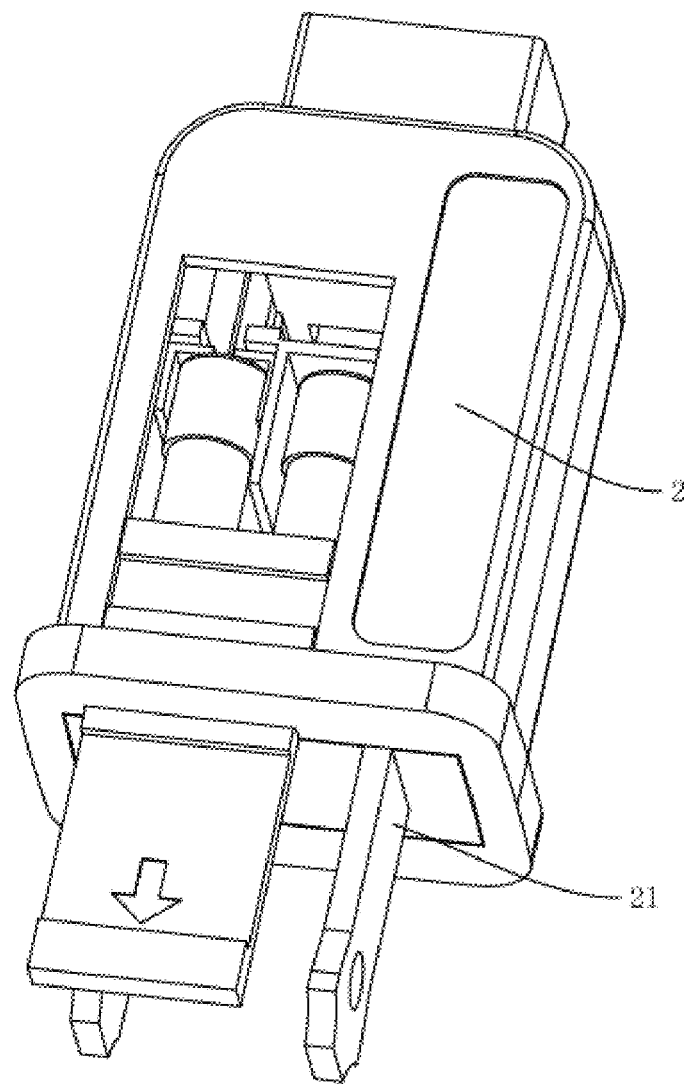
FIG. 4 is a structural schematic of the first connection terminal of the LED light string according to the present invention.

Referring to FIGS. 3-4, the first connection terminal 2 is provided with an installation cavity accommodating a fuse mechanism connected to the male power connection terminal 21.

The first connection terminal 2 is provided with a detachably connected cover plate relative to the installation cavity.

The first connection terminal 2 is provided with the installation cavity inside. The installation cavity can accommodate the fuse mechanism, which is generally a replaceable fuse structure, providing additional protection for the entire LED light string and preventing more serious accidents when the LED light string is damaged. To protect the fuse structure, the cover plate is provided outside the installation cavity. The cover plate can be rotatably or slidably connected to the first connection terminal 2. When fully closed, the cover plate will abut against the fuse structure, making the connection between the fuse mechanism and the circuit more stable. Meanwhile, the cover plate can protect the fuse structure, significantly improving the safety of the LED light string.

Figure 5:
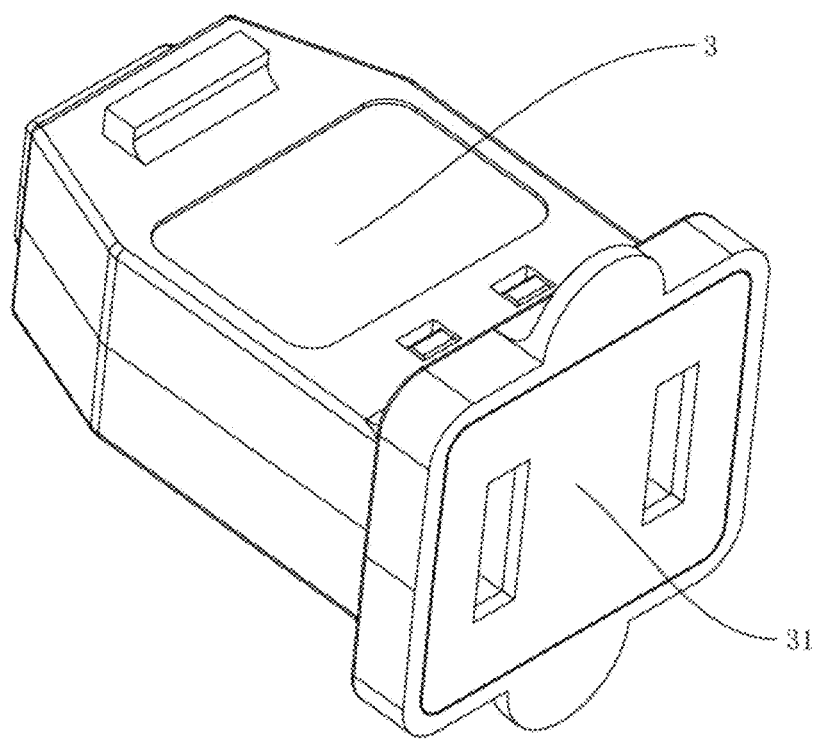
FIG. 5 is a structural schematic of the second connection terminal of the LED light string according to the present invention.
Figure 6:
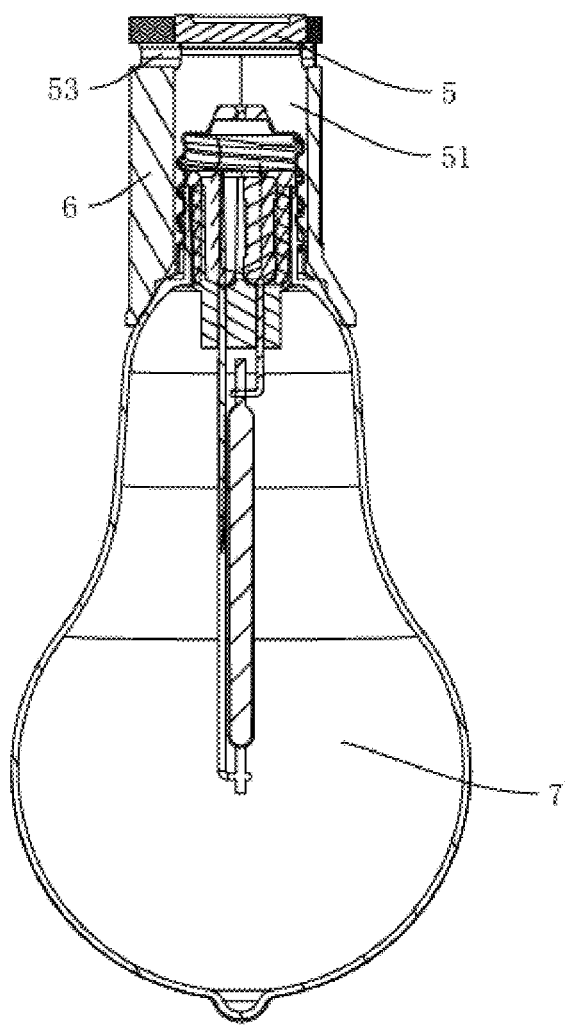
FIG. 6 is a cross-sectional view of the LED lamp assembly in the LED light string according to the present invention.

Referring to FIGS. 3-5, the installation cavity is provided with a limiting sliding groove relative to the cover plate. The cover plate is slidably connected to the limiting sliding groove. An end of the limiting sliding groove facing the male power connection terminal 21 is provided with a limiting portion relative to the cover plate.

In this application, the installation cavity is provided with the limiting sliding groove inside. The cover plate is slidably connected to the limiting sliding groove. The limiting sliding groove is provided with the limiting portion relative to the cover plate. The limiting sliding groove makes the cover plate easy to operate, while the limiting portion can prevent the cover plate from detaching from the first connection terminal 2. The limiting portion can effectively avoid loss of components.

Referring to FIGS. 3-7, a side wall of the connection lamp housing 5 is provided with auxiliary fixing members. The auxiliary fixing members provided on multiple LED lamp assemblies 4 are located on the same side of the light string circuit 1.

In this application, the auxiliary fixing member is an elastic hook. The elastic hook is provided on one side of the light string circuit 1. The elastic hook allows the LED lamp assembly 4 to be quickly and stably installed at a designated position according to user requirements. The auxiliary fixing members are provided on the LED lamp assembly 4 and can stably install the LED lamp assembly 4. The light string circuit 1 can be freely bent and arranged as needed. No matter how the light string circuit 1 is arranged, the LED lamp assembly 4 is already firmly installed. Cooperating with the connection groove 53, the operational stability of the LED lamp structure 7 can be effectively improved.

The multiple auxiliary fixing members on the light string are located on the same side of the light string circuit 1, making the entire light string easy to install according to requirements, preventing the LED light string from falling off, and improving the service life of the light string.

In the drawings of this embodiment, the same or similar reference numerals correspond to the same or similar components. In the description of this application, it should be understood that if there are terms such as "upper", "lower", "left", "right", etc. indicating orientation or positional relationships, they are based on the orientation or positional relationships shown in the drawings, and are only for the convenience of describing the application and simplifying the description, rather than indicating or implying that the referred device or element must have a specific orientation, be constructed and operated in a specific orientation. Therefore, the terms describing positional relationships in the drawings are only for illustrative purposes and cannot be understood as limitations to this patent. For those of ordinary skill in the art, the specific meanings of the above terms can be understood according to specific circumstances.

The above are only preferred embodiments of this application and are not intended to limit this application. Any modifications, equivalent replacements and improvements made within the spirit and principles of this application shall be included in the protection scope of this application.

What is claimed is:
1. An LED light string, comprising a LED lighting circuit without a driving power supply, wherein:
the LED lighting circuit without the driving power supply comprises an AC power supply, a rectification module, a current-limiting and voltage-reducing module, and an LED illumination module;
an input terminal of the AC power supply is connected to the rectification module for converting an AC power into a pulsating DC voltage;
the current-limiting and voltage-reducing module comprises at least one limiting unit, with one end connected to an output terminal of the rectification module and another end connected to the LED illumination module;

the LED illumination module comprises multiple LED beads connected in series and/or parallel, with a total forward voltage drop matching an output voltage of the current-limiting and voltage-reducing module, enabling a stable operation without an independent driver power supply;

the LED light string comprises a light string circuit with multiple mounting portions spaced apart, each provided with an LED lamp assembly;

a first connection terminal and a second connection terminal are provided at two ends of the light string circuit, with a male power connection terminal provided on one end face of the first connection terminal away from the light string circuit, and a female connection terminal provided at a second connection terminal corresponding to the male power connection terminal, the LED lamp assembly comprises a connection lamp housing and an LED lamp structure;

a connection cavity is provided at one end of the connection lamp housing relative to the LED lamp structure and a connection groove is provided at an other end of the connection lamp housing relative to the light string circuit, with the connection groove surrounding the light string circuit; and the connection cavity is provided with a first electrode plate relative to the LED lamp structure, and the first electrode plate is connected to the connection groove and abuts against the light string circuit.

2. The LED light string according to claim 1, wherein:
the connection lamp housing is provided with a connection portion in a protruding manner extending from the female connection terminal toward the male power connection terminal; and the connection portion has one end connected to an outer wall of the connection cavity and the other end connected to the connection groove, with the connection portion surrounding the light string circuit.

3. The LED light string according to claim 2, wherein:
the connection portion is provided with a second electrode plate facing the connection cavity, with the second electrode plate electrically connected to the light string circuit and the outer wall of the connection cavity; and the sidewall of the LED lamp structure is connected to the connection cavity and electrically connected to the second electrode plate.

4. The LED light string according to claim 1, wherein:
the connection cavity is provided with an open end facing the LED lamp structure, with a diameter gradually increasing along a direction from the connection groove to the open end, surrounding the power connection terminal of the LED lamp structure.

5. The LED light string according to claim 1, wherein:
the first connection terminal is provided with an installation cavity installed with a fuse mechanism connected to the male power connection terminal; and the first connection terminal is provided with a detachable cover plate relative to the installation cavity.

6. The LED light string according to claim 5, wherein:
the installation cavity is provided with a sliding groove relative to the cover plate, with an end of the limiting sliding groove facing the male power connection terminal is provided with a limiting portion relative to the cover plate.

7. The LED light string according to claim 1, wherein:
a side wall of the connection lamp housing is provided with auxiliary fixing members; and the auxiliary fixing members provided on multiple LED lamp assemblies are located on the same side of the light string circuit.

8. The LED light string according to claim 1, wherein:
the LED illumination module comprises multiple LED sub-modules connected in parallel; and each LED sub-module comprises multiple LED beads connected in series and/or parallel.

9. The LED light string according to claim 1, wherein:
the rectification module is a full-bridge rectifier circuit comprising an even number of rectifier diodes in a bridge configuration; and the rectification module is provided with connection terminals, both ends of the connection terminals connected to rectifier diodes oriented oppositely relative to the connection terminals, and the input terminal of the AC power supply is connected to the connection terminals.

10. The LED light string according to claim 9, wherein:
at least two rectification modules are provided, symmetrically arranged, with the AC power supply corresponding to one rectification module;

a conduction circuit is provided between the two rectification modules, connected to the rectifier diodes oriented oppositely; and at least two conduction circuits are provided, with the LED illumination module located between them, and the input terminal of the LED illumination module is arranged opposite to the AC power supply.

11. The LED light string according to claim 1, wherein:
a protection unit is provided between the AC power supply and the rectification module; and the protection unit comprises a transient voltage suppressor (TVS) and/or a varistor for overvoltage protection of the AC power supply.

* * * * *